United States Patent
Ceccaroli et al.

(10) Patent No.: US 12,376,617 B2
(45) Date of Patent: Aug. 5, 2025

(54) ROASTING APPARATUS

(71) Applicant: SOCIETE DES PRODUITS NESTLE S.A., Vevey (CH)

(72) Inventors: Stefano Ceccaroli, Chavornay (CH); Flavien Florent Dubief, Champagne (CH); Vincent Martin, Orbe (CH); Stuart Brigante, West Midlands (GB); Paul Gurevitch-Beacock, Staffordshire (GB)

(73) Assignee: Societe des Produits Nestle S.A., Vevey (CH)

( * ) Notice: Subject to any disclaimer, the term of this patent is extended or adjusted under 35 U.S.C. 154(b) by 823 days.

(21) Appl. No.: 17/596,636

(22) PCT Filed: Jun. 15, 2020

(86) PCT No.: PCT/EP2020/066463
§ 371 (c)(1),
(2) Date: Dec. 15, 2021

(87) PCT Pub. No.: WO2020/254234
PCT Pub. Date: Dec. 24, 2020

(65) Prior Publication Data
US 2022/0225656 A1 Jul. 21, 2022

(30) Foreign Application Priority Data
Jun. 18, 2019 (EP) .................................... 19180787

(51) Int. Cl.
*A23N 12/12* (2006.01)
(52) U.S. Cl.
CPC .................................. *A23N 12/125* (2013.01)
(58) Field of Classification Search
CPC ...... A23N 12/08; A23N 12/125; A23N 12/12; A23F 5/04
See application file for complete search history.

(56) References Cited

U.S. PATENT DOCUMENTS

| 3,964,175 A | 6/1976 | Sivetz |
| 5,185,171 A * | 2/1993 | Bersten .................. A23F 5/046 34/360 |

(Continued)

FOREIGN PATENT DOCUMENTS

| AU | 8907001 A | 3/2002 |
| CH | 302138 A | 10/1954 |

(Continued)

OTHER PUBLICATIONS

Russian Office Action for Appl No. 2022100155/10 dated Oct. 23, 2023.

(Continued)

*Primary Examiner* — Ibrahime A Abraham
*Assistant Examiner* — Adam M Eckardt
(74) *Attorney, Agent, or Firm* — K&L Gates LLP

(57) ABSTRACT

The invention concerns an apparatus (10) for roasting coffee beans comprising: —a roasting chamber (1) presenting a bottom opening (11), —an air driver (2) configured to drive a flow of air inside the roasting chamber through the bottom opening of said chamber, —an electrical heater (3) positioned below the bottom opening of the chamber configured to heat said flow of air driven to the bottom opening of the roasting chamber, wherein the apparatus comprises a conduit (6) to drive the flow of hot air from the heater (3) to the bottom opening (11) of the roasting chamber, and wherein said conduit (6) comprises a local transversal constriction (61), and wherein at least one temperature probe is positioned at said local transversal constriction (61) of the conduit.

9 Claims, 3 Drawing Sheets

(56) References Cited

U.S. PATENT DOCUMENTS

| | | | |
|---|---|---|---|
| 5,269,072 A | 12/1993 | Waligorski | |
| 5,960,561 A | 10/1999 | Parodi et al. | |
| 2001/0001349 A1* | 5/2001 | Moon | A23N 12/08 34/577 |
| 2004/0074400 A1 | 4/2004 | Song | |
| 2004/0105922 A1* | 6/2004 | Moon | A23N 12/08 426/466 |
| 2009/0223306 A1 | 9/2009 | Brown et al. | |
| 2016/0016181 A1 | 1/2016 | Lathrop et al. | |

FOREIGN PATENT DOCUMENTS

| | | |
|---|---|---|
| CN | 102018187 A | 4/2011 |
| CN | 102919412 A | 2/2013 |
| CN | 106072713 A | 11/2016 |
| CN | 107821708 A | 3/2018 |
| CN | 108575451 A | 9/2018 |
| CN | 109363207 A | 2/2019 |
| DE | 19859149 A1 | 6/2000 |
| EP | 0449857 A1 | 10/1991 |
| GB | 2151124 | 7/1985 |
| JP | S5376874 A | 7/1978 |
| JP | S5725593 U | 2/1982 |
| JP | S59171823 A | 9/1984 |
| JP | H0684893 U | 12/1994 |
| JP | H09303330 A | 11/1997 |
| JP | 2012088048 A | 5/2012 |
| JP | 2017053542 A | 3/2017 |
| JP | 2018088908 A | 6/2018 |
| RU | 2017113433 A | 10/2018 |
| TW | M499071 U | 4/2015 |
| WO | 2005086730 A2 | 9/2005 |
| WO | 2017178393 A1 | 10/2017 |

OTHER PUBLICATIONS

Chinese Office Action for Chinese Appl Serial No. 202080040355.7 dated Feb. 11, 2023.
Japanese Office Action for Appl No. 2021-573933 dated Mar. 5, 2024.
Japanese Office Action for Appl No. 2021-573933 dated Jan. 7, 2025, 4 pages.

* cited by examiner

ROASTING APPARATUS

CROSS REFERENCE TO RELATED APPLICATIONS

The present application is a National Stage of International Application No. PCT/EP2020/066463, filed on Jun. 15, 2020, which claims priority to European Patent Application No. 19180787.4, filed on Jun. 18, 2019, the entire contents of which are being incorporated herein by reference.

FIELD OF THE INVENTION

The present invention relates to apparatus for roasting coffee beans with heated air and particularly suited for use in the home or in shops and cafes.

BACKGROUND OF THE INVENTION

Roasting of coffee beans at small scale that is at home or in shops and cafes is usually implemented with small sized apparatuses wherein coffee beans are agitated inside hot air.

One type of apparatus uses a rotating perforated drum wherein coffee beans are introduced and tumbled while heat is supplied.

Another type of apparatus uses fluidized bed technology implementing a hot air fluid bed chamber. Within such a chamber, heated air is forced through a screen or a perforated plate under the coffee beans with sufficient force to lift the beans. Heat is transferred to the beans as they tumble and circulate within this fluidized bed.

Derived from an industrial roaster described in U.S. Pat. No. 3,964,175, this technology has been adapted in small domestic devices like U.S. Pat. Nos. 4,484,064, 4,494,314, 4,631,838, 5,269,072, 5,564,331.

In roasting apparatuses, different types of heater can be used like a gas burner or an electrical heater. For small sized roasters, usually electrical heaters are preferred such as a heating resistance.

Most of the roasters implementing fluidized bed technology present the same configuration of the key elements that are the roasting chamber, the heater and the air driver. Quite commonly and obviously, these elements are placed one above the other along a vertical axis, with the air driver positioned at the lowest position, the electrical resistance above and the roasting chamber above the resistance.

Roasting happens by applying a particular heat versus time curve to the coffee beans (called a roasting profile). The control of this roasting profile, through the control of the power of the heater and/or the power of the air driver, is usually obtained by monitoring temperature with a temperature sensor (process control by feedback loop). Ideally this sensor is positioned inside the roasting chamber in order to measure the temperature of the beans themselves. Yet, preferably, in small roasters, the hot air fluid bed chamber is removable from the apparatus in order to introduce and remove the beans manually as well as for cleaning operations. With such a removable chamber, it is not recommended to position a temperature probe inside the chamber and usually, in that configuration, it is preferred to position the temperature sensor below the removable chamber that is to say inside the duct conducting hot air to the chamber. Yet, within this configuration, it has been observed that the measure is not very accurate with the effect that optimal roasting is not provided because of lack of precise information in the temperature feedback loop.

An object of the invention is to address that problem.

SUMMARY OF THE INVENTION

In a first aspect of the invention, there is provided an apparatus for roasting coffee beans comprising:
    a roasting chamber presenting a bottom opening,
    an air driver configured to drive a flow of air inside the roasting chamber through the bottom opening of said chamber,
    an electrical heater positioned below the bottom opening of the chamber configured to heat said flow of air driven to the bottom opening of the roasting chamber,
    wherein the apparatus comprises a conduit to drive the flow of hot air from the heater to the bottom opening of the roasting chamber, and
    wherein said conduit comprises a local transversal constriction reducing the section of the conduit to a minimum transversal section, and
    wherein at least one temperature probe is positioned at said minimum transversal section of the local transversal constriction of the conduit.

The roasting apparatus comprises a roasting chamber presenting a bottom opening and usually a top opening. This roasting chamber is designed to enable the production of a fluidized bed of hot air when hot air is introduced through the bottom opening.

Generally the bottom opening comprises a grid to hold the beans inside the chamber while enabling the passage of hot air therethrough.

The top opening enables the evacuation of smokes and particles generated during the roasting operation. It also enables the introduction of beans to be roasted and the removal of roasted beans at the end of the roasting operation. For these last operations, the roasting chamber is removable from the housing of the apparatus.

The apparatus comprises an air driver configured to drive a flow of air inside the roasting chamber through the bottom opening of said chamber. Usually, this air driver is an air blower or a fan designed to blow air upwardly to the roasting chamber.

The apparatus comprises an electrical heater positioned below the bottom opening of the chamber and configured to heat the flow air before it is introduced inside the roasting chamber.

Generally the heater is positioned just below the bottom opening of the chamber in order to limit loss of heat during the movement of hot air from the heater to the roasting chamber. This position of the heater provides a good temperature regulation during the roasting process in the roasting chamber too: actually any temperature change of the heater immediately impacts the temperature inside the roasting chamber.

In addition, the apparatus comprises a conduit, a pipe, a channel or a tube to drive the flow of hot air from the heater to the bottom opening of the roasting chamber. Accordingly, this conduit guides the flow of hot air from the heater to the bottom opening of the chamber.

This conduit comprises a local transversal constriction reducing the section of the conduit to a minimum transversal section and at least one temperature probe is positioned in this local transversal constriction of the conduit at said minimum transversal section of the conduit.

This local transversal constriction creates a reduction of the hydraulic diameter of the conduit along a small length of the conduit. Air flow circulating through this reduction becomes more homogenised than upstream and, as a result, the temperature measured at this position is more accurate and reliable.

Generally the apparatus comprises a controller arranged to control said apparatus, this controller being adapted to control the electrical heater and/or the air driver based on the temperature of the flow of air measured by the at least one temperature probe.

Due to the more accurate and reliable measure of the flow of hot air introduced in the roasting chamber, the control of electrical heater and/or the air driver through the feedback loop is improved and a predetermined roasting profile curve can be thoroughly applied to the beans. Accordingly, consistent roasting can be applied repeatedly.

At least two temperature probes can be positioned at said minimum transversal section, each probe being positioned at different radial positions. The presence of several probes measuring temperature at different points of the plane of the minimum transversal section permits the verification of the homogeneity of the hot air flow.

In the preferred embodiment, the hydraulic diameter of the minimum transversal section can be comprised between 15 and 25 mm.

Within such an area, the risk different flows of air with different temperatures is minimised.

By hydraulic diameter, it is meant the diameter of a conduit with round section presenting the same cross section area as a conduit with a section of a different shape.

Preferably, the design of the constriction comprises a progressive reduction of the transversal section of the conduit down to a minimum transversal section and a progressive increase of the transversal section of the conduit from said minimum transversal section.

Accordingly, the constriction includes a progressively convergent area and then a progressively divergent area. In addition to the effect of the homogenisation of the air flow at the minimum transversal section, this design provides an acceleration of the velocity of the hot air flow downstream the constriction. As a result, hot air can be introduced in the roasting chamber at a high velocity with the effect of creating a fluidic bed of air and agitating the coffee beans even if the beans are dense like green beans with high level of humidity. Beans are energetically impacted by the flow of a hot air at the bottom opening of the chamber and projected upwardly which enables other beans to be positioned at the bottom. As a result, beans are alternatively positioned at the bottom of the chamber which guarantees an homogenised roasting of all beans and avoid overheating of some of them.

Preferably, the hydraulic diameter (Ø) of the minimum transversal section is comprised between ⅓ and ⅔ of the hydraulic diameter (D) of the conduit upstream the constriction. Generally, the conduit presents the same hydraulic diameter and the same shape upstream and downstream the minimum transversal section.

Preferably, the bottom of the roasting chamber is positioned above the minimum transversal section by a distance d, said distance d being comprised between 2 and 3 times the hydraulic diameter of the minimum transversal section.

As the bottom of the roasting chamber supports the coffee beans introduced inside the chamber, this distance enables the production of a hot air flow with an increased velocity at the bottom opening of the chamber in order to agitate the beans.

In one embodiment, the conduit can comprise a static mixer, said static mixer being positioned upstream the constriction.

This static mixer is configured to disrupt the flow of hot air and mix the potential different zones of air presenting different temperatures downstream the heater. Then, the constriction enables the homogenisation of said mixed flows in temperature and pressure before supplying the roasting chamber with said homogenised hot air.

The static mixer can be designed to create a turbulence, a rotation or a swirl of the hot air.

Any type of air static mixer can be used. The static mixer can be designed in the lateral wall of the conduit, for example as a groove hollowed in the lateral wall and presenting the shape of a spiral or screw thread. The static mixer can comprise fins extending from the lateral wall of the conduit through the section of the conduit.

As mentioned above, preferably, the roasting chamber is removably mounted to the housing, the bottom opening of the roasting chamber cooperating with the hot air outlet end of the conduit when the roasting chamber is mounted to the housing of the apparatus.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

Specific embodiments of the invention are now described further, by way of example, with reference to the following drawings in which.

DETAILED DESCRIPTION OF EXEMPLARY EMBODIMENTS

Roasting Apparatus

Figure 1:
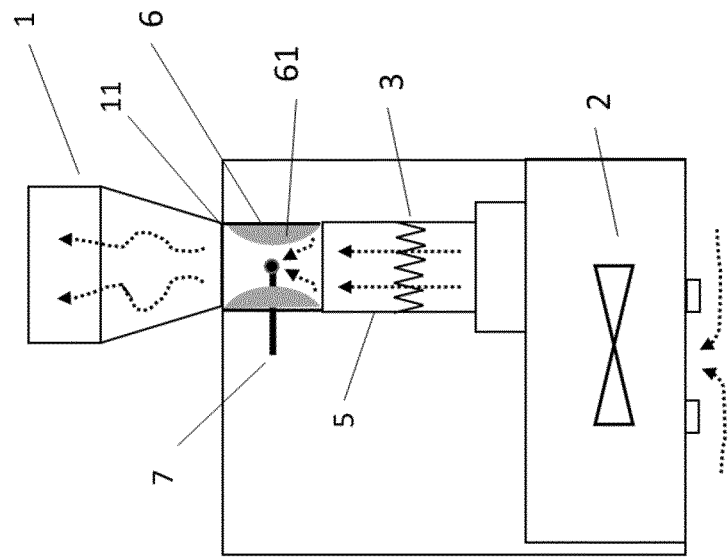
FIG. 1 is a schematic view of a roasting apparatus according to the invention.

FIG. 1 shows an illustrative side view part of a roasting apparatus 10. Functionally, the roasting apparatus 10 is operable to roast coffee beans hold in a chamber 1 by means of a flow of hot air introduced inside this chamber. At a first level, the apparatus comprises: a housing 4, a roasting unit and a control system 80. These components will now be sequentially described.

Roasting Unit of Roasting Apparatus

The roasting unit is operable to receive and roast coffee beans.

The roasting unit typically comprises at a second level of the roasting apparatus 10: a chamber 1, an air flow driver 2, a heater 3, which are sequentially described.

The chamber 1 is configured to receive and hold the coffee beans introduced by the operator. In the preferred embodiment, the chamber 1 is removable from the housing 4. The chamber can be put aside the roasting apparatus:

for the introduction or the removal of coffee beans, or
for cleaning and maintenance of the chamber once it is removed, or for cleaning of the vertical housing part 43 behind the chamber.

The bottom opening 11 of the chamber is configured to enable air to pass through, specifically it can comprise a perforated plate on which the beans can lie and through which air can flow upwardly. The chamber 1 comprises a handle in order to enable the user to remove the chamber from the housing and hold it outside the housing.

A chaff collector (no illustrated) is in flow communication with the chamber 1 to receive chaffs that progressively separate from the beans and due to their light density are blown off to the chaff collector.

The air flow driver 2 is operable to generate a flow of air (dotted lines arrows) in direction of the bottom of the chamber. The generated flow is configured to heat the beans and to agitate and lift the beans. As a result the beans are homogenously heated. Specifically, the air flow driver can be a fan powered by a motor. Air inlets 42 can be provided inside the base of the housing in order to feed air inside the housing, the air flow driver blowing this air upwardly though a passage 5 to an air outlet hole 41 in direction of the chamber 1 as illustrated by dotted lines arrows.

The heater 3 is operable to heat the flow of air generated by the air flow driver 2. In the specific illustrated embodiment, the heater is an electrical resistance being positioned between the fan 2 and the bottom opening 11 of the chamber with the result that the flow of air is heated before it enters the chamber 1 to heat and to lift the beans. The heater 3 is usually positioned just below the air outlet hole 41, generally by at most 10 cm, for a better control of the heating and to avoid heat loss.

The heater 3 is operable to apply a roasting profile to the beans, this roasting profile being defined as a curve of temperature against time.

When the chamber is mounted to the housing, the bottom of the chamber is tightly connected to the air outlet hole 41 to avoid that the flow of hot air flow leaks at the connection.

The top opening 12 of the chamber is connected to a smoke and particulates evacuation device (not illustrated).

Figure 2:
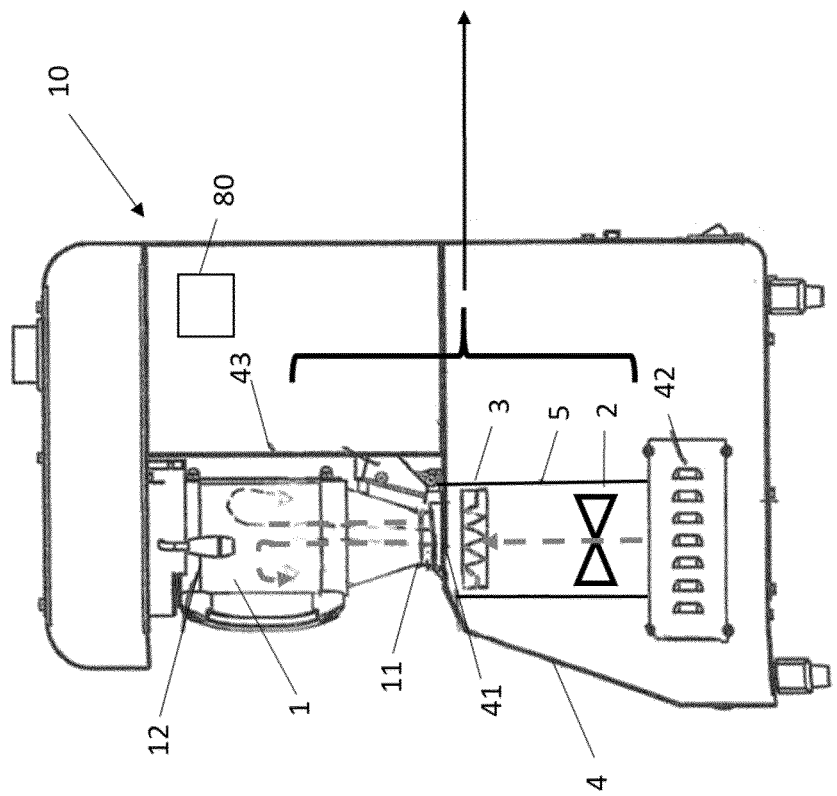
FIG. 2 is a schematic view of the hot air flow generation unit of the apparatus of FIG. 1.

FIG. 2 illustrates more precisely the hot air flow generation unit of FIG. 1 and in particular the conduit or pipe 6 that drives the flow of hot air from the heater to the bottom opening 11 of the roasting chamber. This conduit 6 comprises a local transversal constriction 61 and one temperature probe 7 is positioned at said local transversal constriction.

When passing though this constriction the flow of hot air is homogenised and the temperature measured by the probe 7 provides accurately the temperature of said hot air that is further supplied to the bottom 11 of the roasting chamber. Schematically it is illustrated how the large section of the passage 5 where the flow of air contacts the heater 3 can comprise several flows of air each being heated by the different parts of the heater and being more or less close to the lateral side of the passage 5. These flows are treated differently and although they may present temperatures in the same range of degrees, temperature probes positioned at different radial positions in a cross section of the passage 5 would measure different temperatures. When temperature is information monitored to control the heater and/or the air driver in a feedback loop so as to apply a particular roasting profile (curve of temperature against time), this difference of temperature is not acceptable and leads to inconsistent roasting.

As illustrated by the arrows in the area of the constriction, said constriction forces the different non-homogeneous flows to mix resulting in an air flow presenting the same temperature all other the section of the constriction. As a result, the constriction homogenised air flow and the temperature measured by the probe 7 at the constriction reflects exactly the temperature of the hot air flow supplied to the bottom 11 of the chamber and can be reliably used in the feedback loop of control of the heating.

Figure 3:
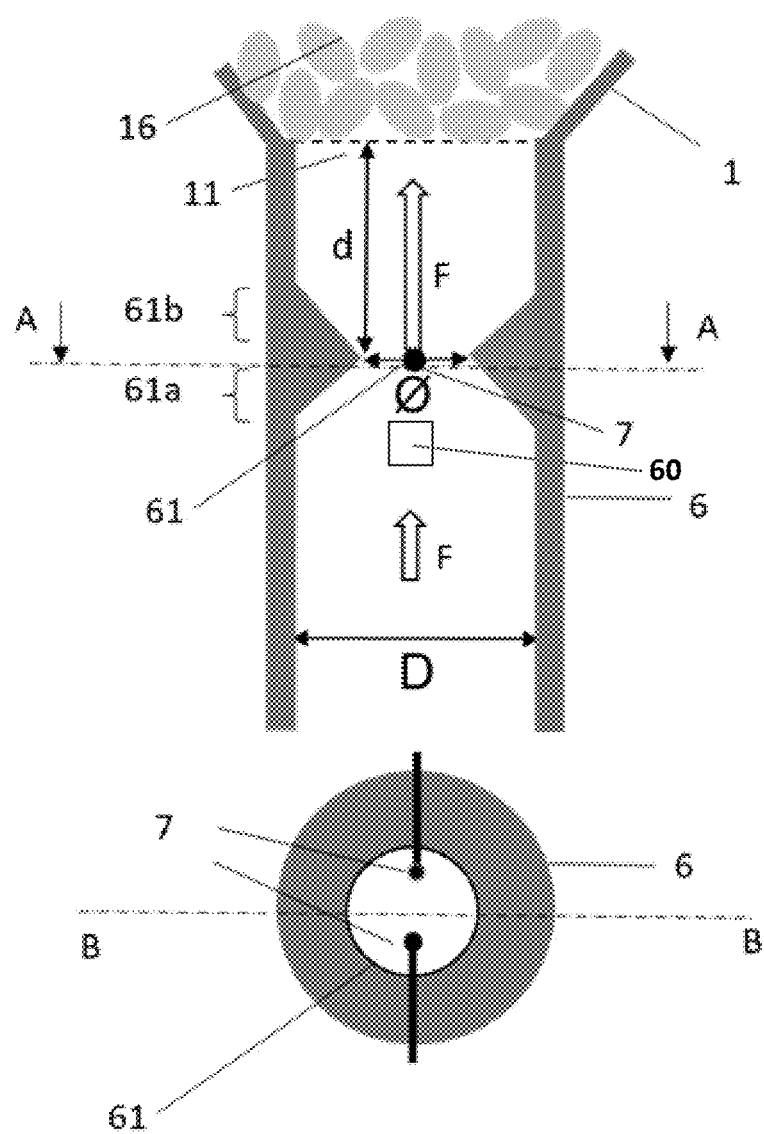
FIG. 3 is a schematic drawing illustrating vertical and cross section of the conduit and the bottom of the roasting chamber in the apparatus according to the present invention.

FIG. 3 provides more details about the constriction 61 in the conduit 6 through a vertical section view along vertical plane BB and a cross section view along the horizontal plane AA traversing the minimum transversal section of the conduit at the constriction 61.

The conduit 6 guides the flow of hot air F that has just contacted the heater to the bottom opening 11 of the roasting chamber. The roasting chamber 1 comprises coffee beans 16.

The beans are retained inside the chamber by a grid or sieve. Accordingly hot air is free to pass through the grid or sieve.

The conduit 6 comprises a constriction 61: the upstream diameter D of the conduit is reduced to a smaller diameter Ø through a progressive reduction 61a. Preferably the section of the conduit is circular, yet, depending on the architecture of the roasting apparatus, other shapes for the section can be envisaged.

Preferably, through this progressive reduction 61a, the hydraulic diameter D of the conduit upstream the constriction 61 is reduced to the hydraulic diameter Ø of the minimum transversal section by a ratio comprised between ⅓ and ⅔ (that is ⅓D<Ø<⅔D).

As illustrated in the cross section view, at least one probe, here two, are positioned at the constriction to measure the temperature of air passing through the constriction. Due to the small cross section, the temperature measured is homogeneous whatever the radial position of the probe in the cross section. Preferably the hydraulic diameter Ø of the minimum transversal section of the constriction is comprised between 15 and 25 mm.

The conduit 6 can be manufactured with this particular internal design of the constriction. Alternatively, an insert can be positioned and attached inside a straight conduit. A static mixer 60 may be positioned upstream of the constriction 61.

The constriction is limited to a local area. Downstream the minimum transversal section, the conduit usually presents the same cross section than upstream the minimum transversal section. Preferably, the constriction comprises a progressive opening 61b. The longitudinal length of the progressive reduction 61a can be of about 15 mm and similarly, the progressive opening 61b can be of about 15 mm.

Further to the progressive opening 61b of the constriction downstream, the velocity of the flow of air F downstream the constriction is increased. This increased velocity of air is particularly useful when hot air impacts the coffee beans 16 in the roasting chamber because the flow of air can exert a force sufficient on beans to lift them up even if these beans are dense like green beans. Beans are separated one from the others and there is renewal of beans positioned at the lowest position of the chamber limiting the risk of overturning the beans. The effect is reinforced if the constriction 61 is not far from the bottom of the chamber 11. Preferably, the bottom 11 of the roasting chamber is positioned above the minimum transversal section by a distance d, said distance d being comprised between 2 and 3 times the hydraulic diameter Ø of the minimum transversal section.

In addition, even if some turbulences are created in the flow of air downstream the constriction, the short distance between the constriction 61 and the bottom 11 does not lead to a change in the temperature measured by the probe(s) and the feedback loop is reliable.

Control System of Roasting Apparatus

Figure 4:
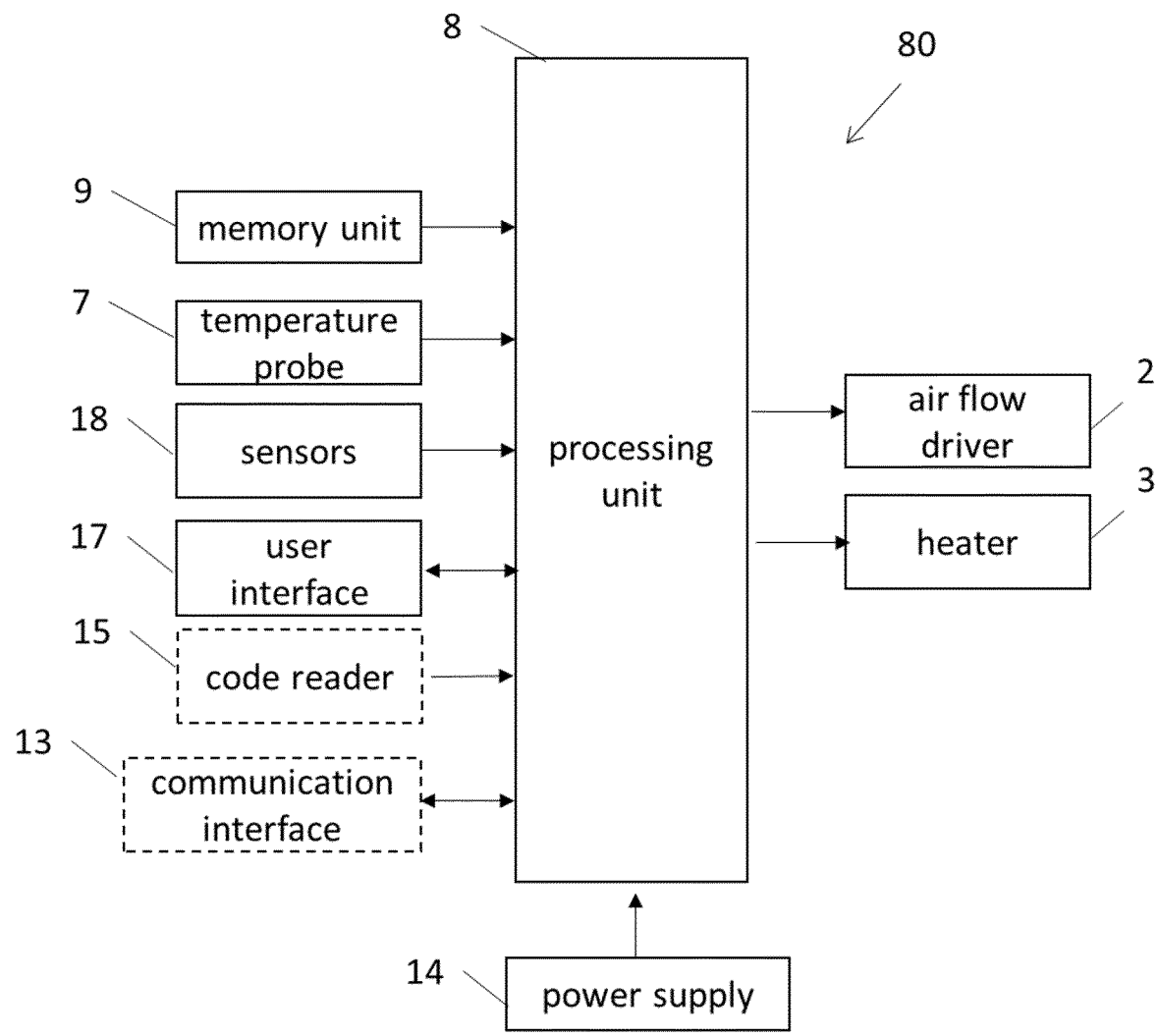
FIG. 4 shows a block diagram of a control system of the apparatus according to FIG. 1.

With reference to FIGS. 1 and 4, the control system 80 will now be considered: the control system 80 is operable to control the components of the apparatus to roast coffee beans. The control system 80 typically comprises at a second level of roasting apparatus: a user interface 17, a processing unit 8, temperature probe 7, a power supply 14, a memory unit 9, sensors 18, optionally a communication interface 13 for remote connection, optionally a code reader 15.

The user interface 17 comprises hardware to enable a user to interface with the processing unit 8, by means of user interface signal. More particularly, the user interface receives commands from a user, the user interface signal transfers the said commands to the processing unit 8 as an input. The commands may, for example, be an instruction to execute a roasting process and/or to adjust an operational parameter of the roasting apparatus 10 and/or to power on or off the roasting apparatus 10. The processing unit 8 may also output feedback to the user interface 17 as part of the roasting process, e.g. to indicate the roasting process has been initiated or that a parameter associated with the process has been selected or to indicate the evolution of a parameter during the process or to create an alarm.

In a particular embodiment, the user interface can be used to provide identification of the coffee beans introduced inside the chamber by the user by manual input such as selection of an identification type in a list of pre-selected coffee beans or by entering a digital reference of the coffee, for example read from a coffee beans package.

The hardware of the user interface may comprise any suitable device(s), for example, the hardware comprises one or more of the following: buttons, such as a joystick button, knob or press button, joystick, LEDs, graphic or character LDCs, graphical screen with touch sensing and/or screen edge buttons. The user interface 20 can be formed as one unit or a plurality of discrete units.

A part of the user interface can also be on a mobile app when the apparatus is provided with a communication interface 13 as described below. In that case the input and output can be transmitted to the mobile device through the communication interface 13.

The sensors 18 are operable to provide an input signal to the processing unit 8 for monitoring of the roasting process and/or a status of the roasting apparatus. The input signal can be an analogue or digital signal. The sensors 18 typically comprise one or more of the following sensors: beans level sensor associated with the chamber 1, air flow rate sensor, position sensor associated with the chamber and/or the chaff collector.

In a similar way, the temperature probe 7 provides an input signal to the processing unit 8 for monitoring of the roasting process at the local transversal constriction 61.

A code reader 15 can be provided and operable to read a code on coffee beans package and automatically provide an input that is the identification of the coffee beans introduced in the chamber 1.

The processing unit 8 generally comprise memory, input and output system components arranged as an integrated circuit, typically as a microprocessor or a microcontroller. The processing unit 8 may comprises other suitable integrated circuits, such as: an ASIC, a programmable logic device such as a PAL, CPLD, FPGA, PSoC, a system on a chip (SoC), an analogue integrated circuit, such as a controller. For such devices, where appropriate, the aforementioned program code can be considered programed logic or to additionally comprise programmed logic. The processing unit 8 may also comprise one or more of the aforementioned integrated circuits. An example of the later is several integrated circuits is arranged in communication with each other in a modular fashion e.g.: a slave integrated circuit to control the user interface 17 in communication with a master integrated circuit to control the roasting unit 10.

The power supply 14 is operable to supply electrical energy to the said controlled components and the processing unit 8. The power supply 14 may comprise various means, such as a battery or a unit to receive and condition a main electrical supply. The power supply 14 may be operatively linked to part of the user interface 17 for powering on or off the roasting apparatus 10.

The processing unit 8 generally comprises a memory unit 9 for storage of instructions as program code and optionally data. To this end the memory unit typically comprises: a non-volatile memory e.g. EPROM, EEPROM or Flash for the storage of program code and operating parameters as instructions, volatile memory (RAM) for temporary data storage. The memory unit may comprise separate and/or integrated (e.g. on a die of the semiconductor) memory. For programmable logic devices the instructions can be stored as programmed logic.

The instructions stored on the memory unit 9 can be idealised as comprising a coffee beans roasting program.

The coffee beans roasting program can effect control of the air flow driver 2 and/or the heater 3 using signal of the temperature sensor 7.

The processing unit 8 is operable to:
receive an input of the temperature sensor 7,
process the input according to roasting program code (or programmed logic) stored on the memory unit 9 (or eventually inputted from an external source such as the communication interface 13),
provide an output, which is the roasting process according to the roasting recipe. More specifically the output comprises the operation of at least the heater 3 and the air flow driver 2.

The temperature measured by the temperature probe 7 is used to adapt the power of the heater 3 and/or the power of the air driver 2 in a feedback loop in order to apply a pre-determined roasting profile to the beans.

Depending on the type of control applied in the roaster, the heater 3 can be powered at one pre-determined power, meaning its temperature is constant, and in that case the power of the air driver 2 can be controlled based on the temperature monitored at the probe 7 in order to vary the time of contact of the flow air through the heater during its movement.

Alternatively, the air driver 2 can be powered at one pre-determined power, meaning the flow rate of air is constant, and in that case the power of the heater 2 can be controlled based on the temperature monitored at the probe 7 in order to heat more or less air during its passage through the heater.

In a last alternative, both heater 3 and air driver 2 can be controlled based on the monitoring of the temperature by probe 7.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS

| | |
|---|---|
| roasting chamber | 1 |
| bottom opening | 11 |
| top opening | 12 |
| air driver | 2 |
| heater | 3 |
| housing | 4 |
| air outlet hole | 41 |
| air inlet | 42 |
| vertical part | 43 |
| air passage | 5 |
| duct | 6 |
| constriction | 61 |
| reduction | 61a |
| opening | 61b |
| temperature probe | 7 |
| control system | 8 |
| processing unit | 80 |
| roasting apparatus | 10 |
| communication interface | 13 |
| power supply | 14 |
| code reader | 15 |
| coffee beans | 16 |
| user interface | 17 |
| sensors | 18 |

The invention claimed is:

1. An apparatus for roasting coffee beans, the apparatus comprising:
   a roasting chamber presenting a bottom opening,
   an air driver configured to drive a flow of air inside the roasting chamber through the bottom opening of the roasting chamber,
   an electrical heater positioned below the bottom opening of the roasting chamber configured to heat the flow of air driven to the bottom opening of the roasting chamber,
   wherein the apparatus comprises a conduit to drive the flow of air from the electrical heater to the bottom opening of the roasting chamber,
   wherein the conduit comprises a local transversal constriction reducing a section of the conduit to a minimum transversal section, and
   wherein at least one temperature probe is positioned at the minimum transversal section of the conduit.

2. The apparatus according to claim 1, wherein the apparatus comprises a controller arranged to control the apparatus, the controller being adapted to control the electrical heater and/or the air driver based on the temperature of the flow of air measured by the at least one temperature probe.

3. The apparatus according to claim 1, wherein at least two temperature probes are positioned at the minimum transversal section of the conduit, each temperature probe being positioned at different radial positions.

4. The apparatus according to claim 1, wherein a hydraulic diameter of the minimum transversal section of the local transversal constriction is between 15 and 25 mm.

5. The apparatus according to claim 1, wherein a design of the local transversal constriction comprises a progressive reduction of the transversal section of the conduit down to the minimum transversal section and a progressive opening of the transversal section of the conduit from the minimum transversal section.

6. The apparatus according to claim 1, wherein a hydraulic diameter of the minimum transversal section is between ⅓ and ⅔ of a hydraulic diameter of the conduit upstream the local transversal constriction.

7. The apparatus according to claim 1, wherein the bottom opening of the roasting chamber is positioned above the minimum transversal section by a distance d, the distance d being between 2 and 3 times a hydraulic diameter of the minimum transversal section.

8. The apparatus according to claim 1, wherein the conduit comprises a static mixer, the static mixer being positioned upstream the constriction.

9. The apparatus according to claim 1, wherein the roasting chamber is removably mounted to a housing, the bottom opening of the roasting chamber cooperating with a hot air outlet end of the conduit when the roasting chamber is mounted to the housing of the roasting apparatus.

* * * * *